(12) United States Patent
Low et al.

(10) Patent No.: US 6,942,292 B2
(45) Date of Patent: Sep. 13, 2005

(54) ADJUSTABLE HEAD RESTRAINT OR HEADREST

(75) Inventors: Kar Keong Low, Southfield, MI (US); Nagarjun V. Yetukuri, Rochester Hills, MI (US); Kenneth J. McQueen, Leonard, MI (US); Mark S. Sebby, Brighton, MI (US); Kevin L. Gasparotto, New Hudson, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/605,820

(22) Filed: Oct. 29, 2003

(65) Prior Publication Data

US 2005/0093349 A1 May 5, 2005

(51) Int. Cl.⁷ .............................................. B60N 2/48
(52) U.S. Cl. ................. 297/216.12; 297/404; 297/406; 297/408
(58) Field of Search ............................... 297/404, 406, 297/408, 216.12

(56) References Cited

U.S. PATENT DOCUMENTS

| 2,973,029 | A | * | 2/1961 | Schlosstein | ............ 297/216.12 |
| 5,238,295 | A | | 8/1993 | Harrell | ........................ 297/408 |
| 5,820,211 | A | * | 10/1998 | Heilig et al. | ............ 297/216.12 |
| 5,842,738 | A | * | 12/1998 | Knoll et al. | ............ 297/216.12 |
| 5,934,750 | A | * | 8/1999 | Fohl | ........................ 297/216.12 |
| 6,033,018 | A | * | 3/2000 | Fohl | ........................ 297/216.13 |
| 6,045,181 | A | * | 4/2000 | Ikeda et al. | ............. 297/216.12 |
| 6,402,238 | B1 | | 6/2002 | Bigi et al. | .............. 297/216.12 |
| 2001/0028190 | A1 | | 10/2001 | Nakane et al. | .............. 297/408 |
| 2001/0040396 | A1 | | 11/2001 | Kreuels et al. | ......... 297/216.12 |
| 2002/0043858 | A1 | | 4/2002 | Svantesson et al. | ........ 297/391 |
| 2002/0070597 | A1 | * | 6/2002 | Liu | ............................ 297/408 |

FOREIGN PATENT DOCUMENTS

| DE | 19650321 A1 | | 6/1996 | |
| DE | 19650321 A1 | * | 6/1998 | ............ B60N 2/48 |

* cited by examiner

*Primary Examiner*—Peter M. Cuomo
*Assistant Examiner*—Stephen D'Adamo
(74) *Attorney, Agent, or Firm*—Bill C. Panagos

(57) ABSTRACT

A tilt-adjustable head restraint assembly includes a hollowed head restraint body pivotally connected to a U-shaped mounting post. A ratcheting mechanism is disposed within the head restraint body and includes a ratchet interacting with a rack of ratchet teeth. The ratchet has an inertia gear engaged therewith to slow the forward movement of the pivoting head restraint when the ratchet is engaged to allow forward movement of the head restraint, and further has a plunger mechanism which allows for the pivoting of the head restraint in a hands free manner by the application of a static force or pressure.

20 Claims, 4 Drawing Sheets

ADJUSTABLE HEAD RESTRAINT OR HEADREST

BACKGROUND OF INVENTION

1. Field of the Invention

The present invention generally relates to an adjustable head restraint for use with a seat such as, for example, a vehicle seat, particularly to such head restraints having a ratcheting mechanism for controlling the angular position of the head restraint. More particularly the present invention is directed to a head restraint which may be easily adjusted in both forward and rearward directions without the use of the occupant's hands.

2. Description of the Related Art

Various head restraints are known to the art which include a head restraint body pivotally coupled to a mounting post for enabling the head restraint body to pivot in a forward and rearward direction to achieve a desired position of angular adjustment chosen by the user. Such head restraints are also known to include various ratcheting détente mechanisms which allow the head restraint to pivot forwardly but limit its rearward pivotal movement for safety reasons.

However, these designs do not provide for hands free easy adjustment to allow moving the head restraint forward and rearward to a desired position. Furthermore, the prior art does not appear to meet the new proposed safety requirements for vehicle head restraints.

For example, U.S. Pat. No. 5,238,295 issued Aug. 24, 1993 to Harrell teaches a pawl and ratchet mechanism for positioning a head restraint by using the hands to move the head restraint forward to a desired position.

U.S. Pat. No. 6,402,238 issued Jun. 11, 2002 to Bigi et al teaches an expanding head restraint similar in function and action to an air bag in the event of a collision.

U.S. patent application Ser. No. 2001/0028190 published Oct. 11, 2001 to Nakane et al teaches a friction controlled head restraint adjustment mechanism.

U.S. patent application Ser. No. 2001/0040396 published Nov. 15, 2001 to Kreuels et al teaches a head restraint having an inertia trigger for allowing the expansion of a head restraint in the event of a collision.

U.S. patent application Ser. No. 2002/0043858 published Apr. 18, 2002 to Svantesson et al teaches a spring loaded expansion mechanism to enlarge a head restraint upon a sensor identifying a collision event.

DISCLOSURE OF THE INVENTION

The present invention provides advantages and alternatives over the prior art by providing a hands free adjustable head restraint assembly including a mounting post having a horizontal portion, a head restraint body disposed about said horizontal portion, and pivot connection means for connecting the head restraint body pivotally to the mounting post for enabling the head restraint body to pivot relative to the mounting post. Ratcheting means act between the mounting post and the head restraint body for permitting the head restraint body to pivot in one direction while selectively locking the head restraint body against reverse pivotal movement. The characterizing feature of the assembly is the construction of the hands free plunger mechanism which allows for the positioning of the head restraint and engaging and disengaging of the ratcheting mechanism without the need of the seat occupant to use his hands to position the head restraint.

In another aspect of the present invention, there is presented a ratcheting head rest for use on the back of any seating device. These seating devices include, but are not limited to, vehicle seats, airplane seats, office furniture, and residential furniture.

According to a further aspect of the present invention, there is presented a ratcheting head restraint which provides for hands free positioning of a head restraint while maintaining the ability to prevent movement of the head restraint during a collision.

According to a further aspect of the present invention, there is presented an adjustable head restraint assembly comprising: a mounting post having a horizontal portion; a head restraint portion disposed about said mounting post horizontal portion and further characterized as mounted to at least one spring mounted fixedly about said mounting post horizontal portion; pivoting bracket connecting said head restraint body to said mounting post horizontal portion for enabling said head restraint body to pivot relative to said mounting post; ratcheting means acting between said mounting post and said head restraint body for permitting said head restraint body to pivot in one direction and selectively locking said head restraint body against pivotal movement in the opposite direction, said ratcheting means including a ratcheting gear having a plurality of teeth and a pawl having a pair of teeth containing ends, for selectively alternatively engaging said ratcheting gear teeth, a first pawl end when engaged allowing movement of the ratcheting gear only in one direction and a second pawl end when engaged allowing movement of the ratcheting gear in the opposite direction only, to control the movement of said head restraint body; and characterized by said ratcheting means comprises; a ratcheting position locking mechanism comprising; a pivoting bracket for mounting an inertia spring connecting rod, an inertia spring pawl connecting rod for mounting one end of a plurality of inertia springs and the non-rack engaging end of a pawl, a plurality of inertia springs, a pawl mounting rod for mounting said pawl to said pivoting bracket, a ratcheting gear mounted on said mounting post horizontal portion upon which said pawl engages as well as linear damping toothed rotary gear in operable engagement with toothed rack to slow the forward motion of said adjustable head restraint assembly during forward positioning; and a ratchet plunger release mechanism comprising; a plunger end, mounted within a mounting sleeve, both being mounted on a plunger rod, said plunger rod moveably mounted through said pivoting bracket and having a plunger end return biasing spring mounted on said plunger rod between the distal end of said mounting sleeve and the proximal face of said pivoting bracket to return said plunger end to a forward most position when rearward pressure is removed from said plunger end.

According to a further aspect of the present invention, there is presented an adjustable head restraint assembly comprising: a mounting post having a horizontal portion; a head restraint portion disposed about said mounting post horizontal portion and further characterized as mounted to at least one spring mounted fixedly about said mounting post horizontal portion; pivoting bracket connecting said head restraint body to said mounting post horizontal portion for enabling said head restraint body to pivot relative to said mounting post; ratcheting means acting between said mounting post and said head restraint body for permitting said head restraint body to pivot in one direction and selectively locking said head restraint body against pivotal movement in the opposite direction, said ratcheting means including a ratcheting gear having a plurality of teeth and a pawl having a pair of teeth containing ends, for selectively alternatively engaging said ratcheting gear teeth, a first pawl end when engaged allowing movement of the ratcheting gear only in one direction and a second pawl end when engaged allowing movement of the ratcheting gear in the opposite direction only, to control the movement of said head restraint body, and characterized by said ratcheting means comprises; a ratcheting position locking mechanism comprising; a pivoting bracket for mounting an inertia spring connecting rod, an inertia spring pawl connecting rod for mounting one end of a plurality of inertia springs, and inertia lock assembly and the non-rack engaging end of a pawl, a plurality of inertia springs, a pawl mounting rod for mounting said pawl to said pivoting bracket, a ratcheting gear mounted on said mounting post horizontal portion upon which said pawl engages as well as linear damping toothed rotary gear in operable engagement with toothed rack to slow the forward motion of said adjustable head restraint assembly during forward positioning; and a ratchet plunger release mechanism comprising a plunger end, having a pressure activation unit mounted thereon, said plunger mounted within a mounting sleeve, both being mounted on a plunger rod, said plunger rod moveably mounted through said pivoting bracket and having a plunger end return biasing spring mounted on said plunger rod between the distal end of said mounting sleeve and the proximal face of said pivoting bracket to return said plunger end to a forward most position when rearward pressure is removed from said plunger end.

The present invention thus advantageously provides a pivoting head restraint having a easy adjusting hands free locking ratcheting means designed such that the head restraint position may be altered without the need to use ones hands.

DETAILED DESCRIPTION

Figure 1:
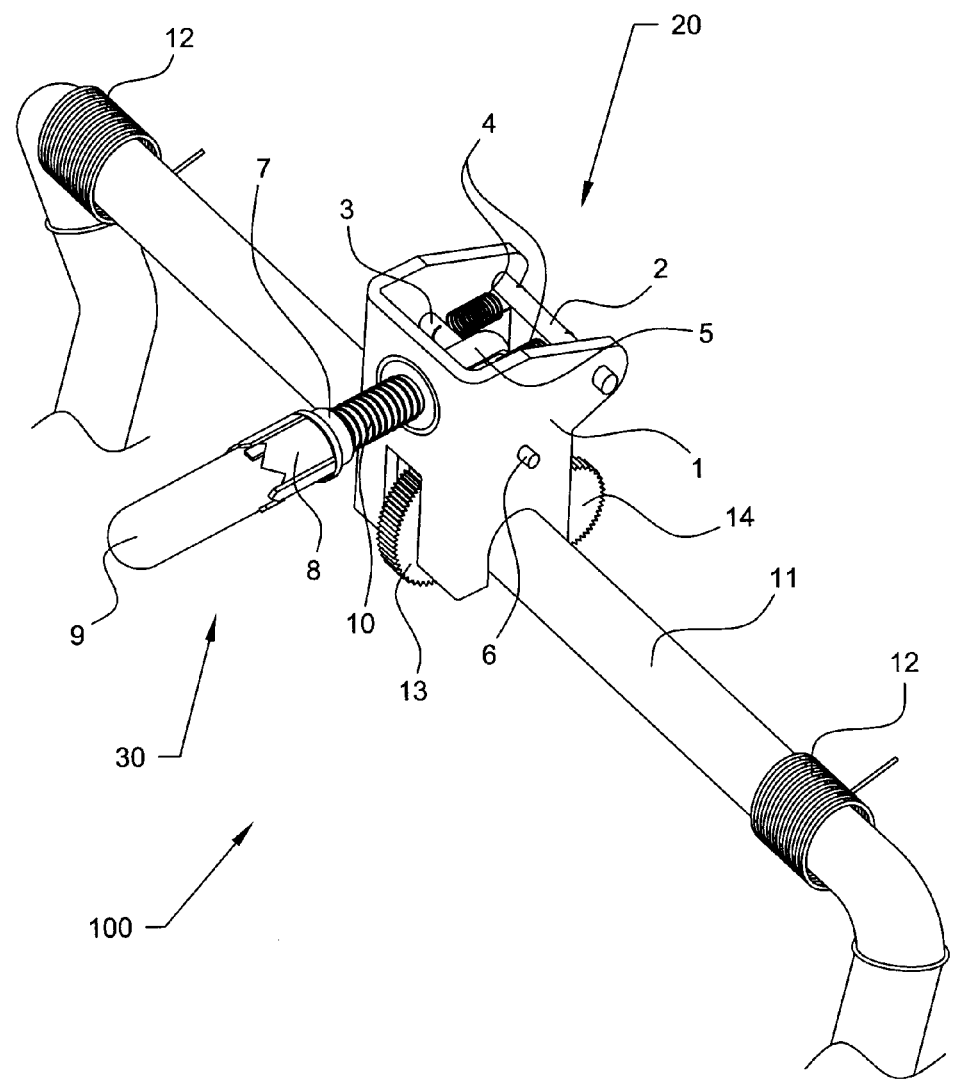
FIG. 1 shows a perspective front view of the ratcheting head restraint of the present invention.

Reference will now be made to the drawings, wherein to the extent possible like reference numerals are utilized to designate like components throughout the various views. Generally, the present invention discloses an adjustable head restraint assembly constructed according to a presently preferred embodiment of the invention generally shown at 100 in FIG. 1 and includes a head restraint body mounted to mounting post 11 for attachment to a seat (not shown). The mounting post 11 is a generally U-shaped support having a pair of spaced apart and parallel extending legs integrally joined at their upper ends by a generally horizontal transverse cross member portion. The mounting post 11 is constructed from a single piece of cylindrical metal rod or cylindrical metal tube having a generally circular cross section which has been bent into the U-shape to form the legs and cross member. The legs are formed on their rearward side with a plurality of notches which are designed to engage a vertical adjustment mechanism of the seat in a manner well known in the art.

Referring to FIG. 1, which presents a perspective front view of the easy adjust ratcheting head restraint 100 of the present invention having a ratcheting position locking mechanism 20 and a ratchet plunger release mechanism 30.

As further shown in FIG. 1 the ratcheting position locking mechanism 20 comprises a pivoting bracket 1 for mounting an inertia spring connecting rod 2, a inertia spring pawl connecting rod 3, inertia springs 4, and pawl mounting rod 6 for mounting pawl 5 to pivoting bracket 1. The ratcheting position locking mechanism 20 is mounted on head restraint post 11 in operable interaction with a ratcheting gear 13 upon which pawl 5 engages as well as linear damping toothed rotary gear 14 in operable engagement with ratcheting gear 13 to slow the forward motion of the head restraint during forward positioning.

As also shown in FIG. 1, is the ratchet plunger release mechanism 30 comprising a plunger end 9, mounted within mounting sleeve 8, both being mounted on plunger rod 7 and having a plunger end return biasing spring 10 mounted on plunger rod 7 between the distal end of mounting sleeve 8 and the proximal face of pivoting bracket 1 to return plunger end 9 to a forward most position when rearward pressure is removed. It is to be understood that a pressure plate 18 may be operably connected to the plunger end 9 to increase the area available to receive and distribute the application of an activating load or force.

Finally, FIG. 1 shows a pair of springs 12 mounted on the head restraint post 11 and connected to the head restraint body (not shown) to provide movement of the head restraint corresponding to movement of the position locking mechanism thereby allowing positioning and position locking of the head restraint. In another preferred embodiment there is also mounted an inertial lock assembly 17 which assures that during a collision the head restraint assembly can not move rearward.

Figure 2:
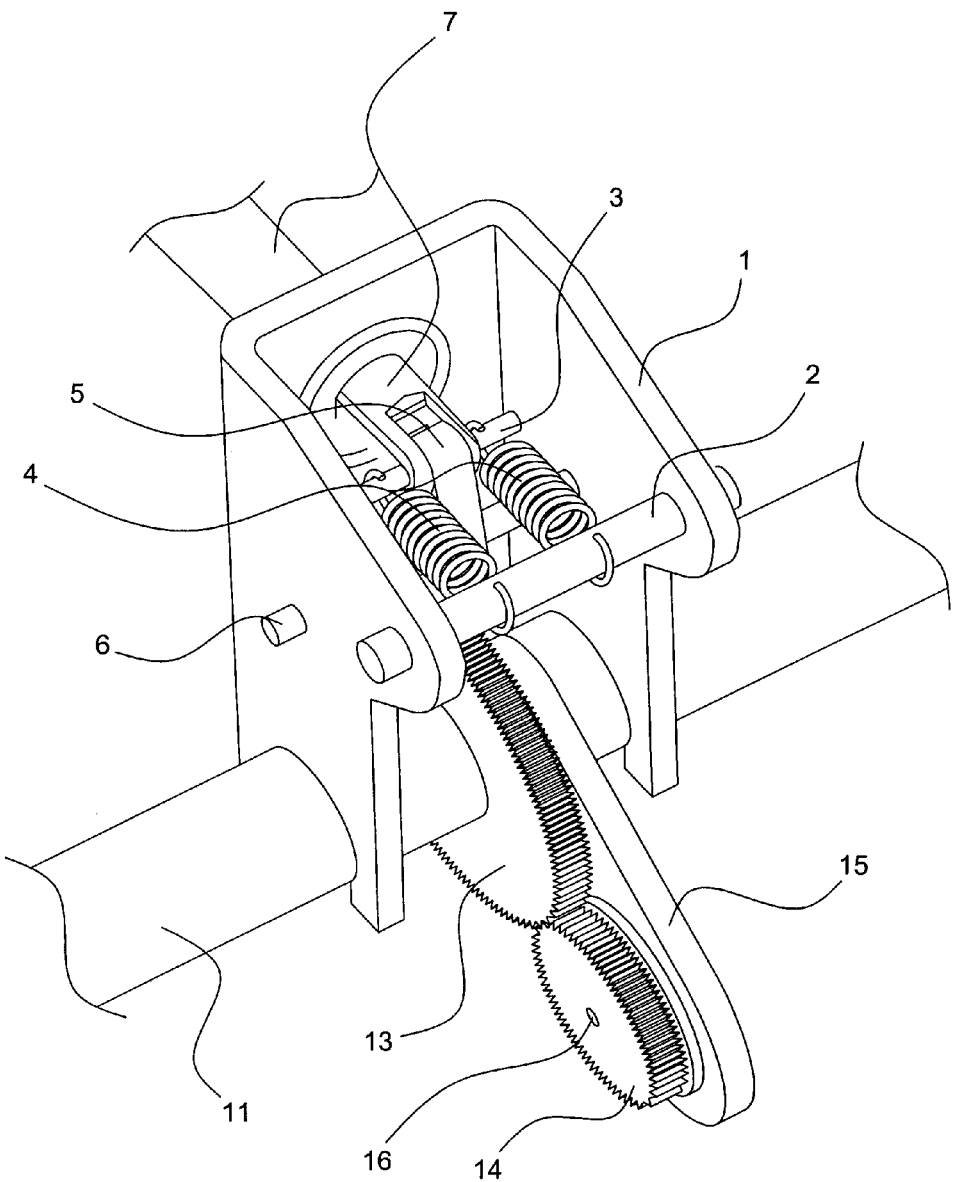
FIG. 2 shows a partial perspective rear view of the ratcheting head restraint of the present invention.

Referring now to FIG. 2, there is shown a perspective rear view of the ratcheting position locking mechanism 20 including a section of the head restraint post 11 upon which is mounted pivoting bracket 1. Also mounted on head restraint post 11 is ratcheting gear 13 to which is engaged linear damping toothed rotary gear 14. Further there is shown the connection of the plunger rod 7 to pawl 5 through the use of pawl connecting rod 3, and pawl 5 is mounted to pivoting bracket 1 by means of pawl mounting rod 6. Inertia springs 4 are each connected by one of their ends to pawl connecting rod 3 and by each of there other ends to inertia spring connecting rod 2 mounted to pivoting bracket 1.

Figure 3:
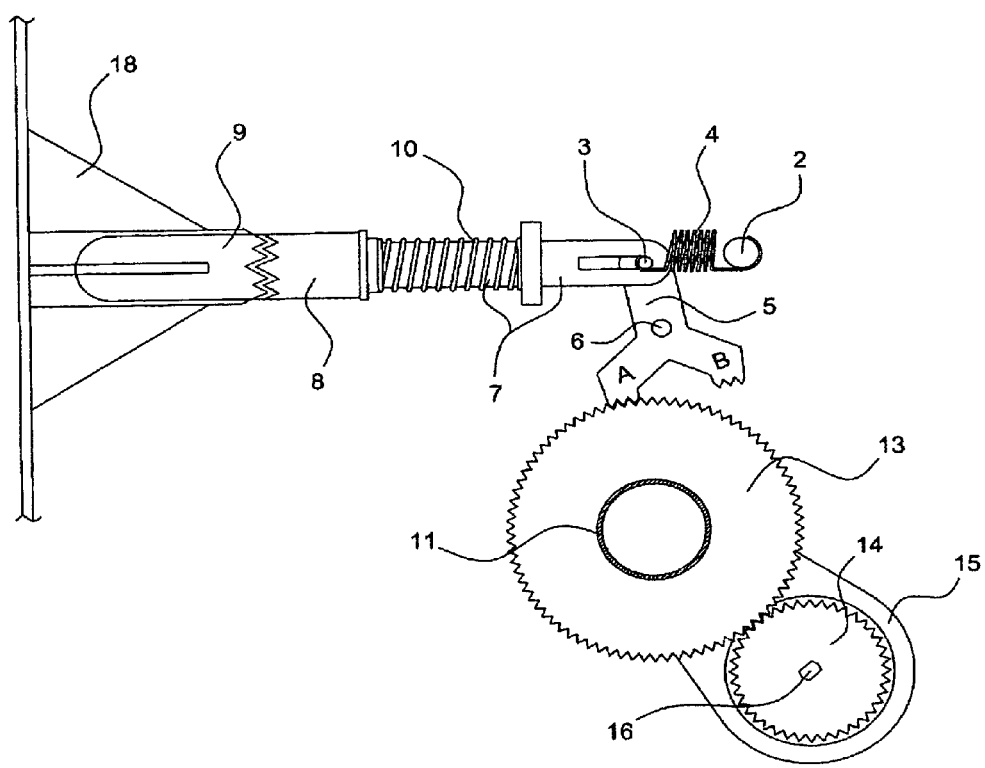
FIG. 3 shows a plan partial side view of the ratcheting mechanism of the present invention.

Turning now to FIG. 3, there is shown a plan side view of the pawl 5 and ratcheting gear 13 engagement and the operable connections of the various parts of the present invention. Pawl 5, shown in a preferred embodiment, has two gear-engaging ends 5A and 5B that control the direction of movement of ratcheting gear 13. Particularly there is shown plunger 7 having mounted on its forward or proximal end, plunger end 9, mounting sleeve 8, and plunger end return biasing spring 10. Spring 10 has a normally extended condition to hold the plunger end 9 in its forward position until depressed by the movement of an occupant's head. On the rearward or distal end of plunger 7 is moveably mounted to the upper ends of pawl 5 by means of pawl connecting rod 3. Pawl 5 is pivotally connected to pivoting bracket 1 (not shown) by means of pawl mounting rod 6. The lower pawl end 5A is normally engaged with ratcheting gear 13 by a plurality of teeth located on said lower end of pawl 5A. The ratcheting gear 13 is also shown mounted on head restraint post 11. Permanently engaged in ratcheting gear 13 is linear damping rotary gear 14 used to control the speed of the forward motion of plunger 7 when the pawl ends 5A and 5B are disengaged from ratcheting gear 13.

Also shown is an inertia spring 4 connected at one end to pawl connecting rod 3 and at its other end to spring connecting rod 2. Optional pressure plate 18 is shown operably connected to plunger 9.

Figure 4:
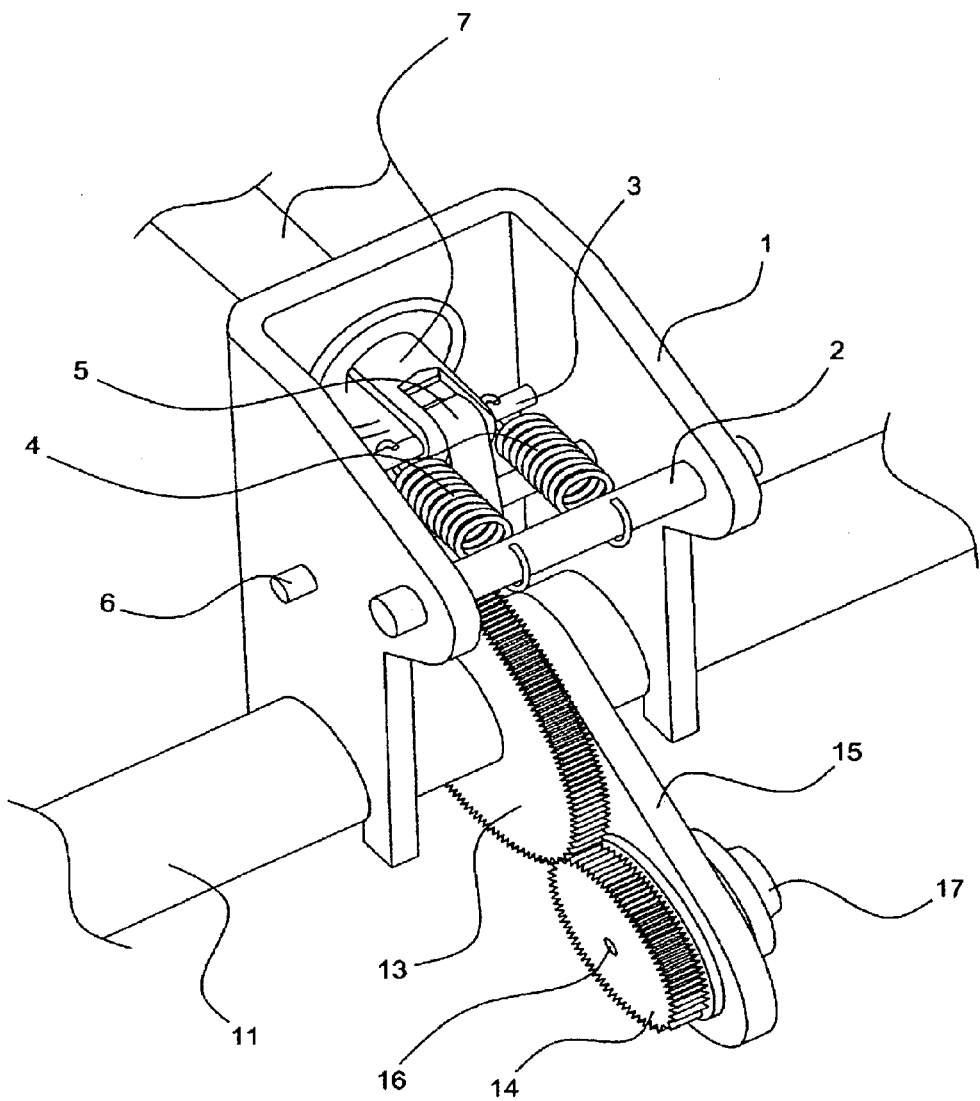
FIG. 4 shows a partial perspective rear view of the ratcheting head restraint of the present invention utilizing a fluid damper.

Turning to FIG. 4 there is shown a perspective rearview of the ratcheting position locking mechanism 20 including a section of the head restraint post 11 upon which is mounted pivoting bracket 1. Also mounted on head restraint post 11 is ratcheting gear 13 to which is engaged linear damping toothed rotary gear 14. Further there is shown the connection of the plunger rod 7 to pawl 5 through the use of pawl connecting rod 3, and pawl 5 is mounted to pivoting bracket 1 by means of pawl mounting rod 6. Fluid damper 17 is operatively connected to linear damping toothed rotary gear 14 regulating the speed of movement of linear damping toothed rotary gear 14. Inertia springs 4 are each connected by one of their ends to pawl connecting rod 3 and by each of there other ends to inertia spring connecting rod 2 mounted to pivoting bracket 1.

In practice, the head restraint of the present invention is in a most rearward position upon the top of the seat back of a seat. The occupant of the seat applies an activating force or pressure rearward against the head restraint surface causes the head rest plunger end 9 and plunger 7 to move rearward which in turn causes the upper end of the pawl 5 to move rearward pivoting on pawl mounting rod 6 thereby causing the lower pawl toothed end 5A to disengage from the ratcheting gear 13 and lower pawl toothed end 5B to engage, freeing the head restraint and allowing the head restraint to move forward, the speed of the forward movement of the head restraint being governed by the linear damping toothed rotary gear 14. When the head restraint comes either to its forward most position or the occupant releases pressure against the head restraint plunger end 9, the spring 4 causes the pawl end 5B to disengage and pawl end 5A to re-engage with the ratcheting gear 13 locking the head restraint in position.

Materials suitable for use in the present invention are well known in the art including, for example, metal and polymeric compositions. Presently preferred materials for the spring connecting rod 2, pawl connecting rod 3, and pawl mounting rod 6 is solid steel rod, for pivoting bracket 1 plated spring steel, for inertia springs 4, plunger end return biasing spring 10 and springs 12 plated steel springs, for pawl 5, plunger 7, mounting sleeve 8, plunger end 9, head restraint post 11, and ratcheting gear 13 high strength steel. The presently preferred material for linear damping toothed rotary gear 14 is molded plastic.

It is to be understood that the use of the terms head restraint and headrest are interchangeable and the present invention applies to both. It is to be further understood that in describing the use of a seat occupant's head or hands to apply the activating force to activate the present invention it is contemplated that any activating force means may be used to effect the operation of the present invention. It is still further understood that the pivoting movement of the head restraint may move one of either the top front or the bottom front portion of the head restraint. While the mounting post 11 has been described as generally U-shaped and generally cylindrical it is to be understood that various other shapes and geometries well known in the art may also be used with the present invention. The presently preferred inertia device is a pair of springs 12, however in another embodiment of the present invention the inertia device is fluid damper such as, for example, the air damper sold under the name Compact Linear Damper by Illinois Tool Works Inc. of Glenview, Ill and described in U.S. Pat, No. 6,176,475.

Although the preferred embodiments of the present invention has been disclosed, various changes and modifications may be made without departing from the scope of the invention as set forth in the appended claims.

What is claimed is:

1. An adjustable head restraint assembly comprising:
   a mounting post having a horizontal portion;
   a head restraint portion disposed about said mounting post horizontal portion and further characterized as mounted to at least one spring mounted fixedly about said mounting post horizontal portion;
   pivoting bracket connecting said head restraint body to said mounting post horizontal portion for enabling said head restraint body to pivot relative to said mounting post;
   ratcheting means acting between said mounting post and said head restraint body for permitting said head restraint body to pivot in a first direction and selectively locking said head restraint body against pivotal movement in a direction opposite said first direction, said ratcheting means including a ratcheting gear having a plurality of teeth and a pawl having a pair of teeth containing ends, for selectively alternatively engaging said ratcheting gear teeth, a first pawl end when engaged allowing movement of the ratcheting gear only in a first direction and a second pawl end when engaged allowing movement of the ratcheting gear in a direction opposite said first direction only, to control the movement of said head restraint body, and
   characterized by said ratcheting means comprises;
      a ratcheting position locking mechanism comprising;
         a pivoting bracket for mounting an inertia spring connecting rod,
         an inertia spring pawl connecting rod for mounting one end of a plurality of inertia springs and the non-ratcheting gear engaging end of a pawl,
         a plurality of inertia springs,
         a pawl mounting rod for mounting said pawl to said pivoting bracket,
         a ratcheting gear mounted on said mounting post horizontal portion upon which said pawl engages as well as linear damping toothed rotary gear in operable engagement with said ratcheting gear to slow the forward motion of said adjustable head restraint assembly during forward positioning; and
      a ratchet plunger release mechanism comprising;
         a plunger end, mounted within a mounting sleeve, both being mounted on a plunger rod, said plunger rod moveably mounted through said pivoting bracket and having a plunger end return biasing spring mounted on said plunger rod between said mounting sleeve and said pivoting bracket to return said plunger end to a forward most position when rearward pressure is removed from said plunger end.

2. The adjustable head restraint assembly as claimed in claim 1, wherein said ratcheting position locking mechanism comprises a metal, particularly steel.

3. The adjustable head restraint assembly as claimed in claim 1, wherein said ratchet plunger release mechanism plunger rod comprises a metal, particularly steel.

4. The adjustable head restraint assembly as claimed in claim 1, wherein said ratchet plunger release mechanism plunger end and said mounting sleeve comprises metal, particularly steel.

5. The adjustable head restraint assembly as claimed in claim 1, wherein said linear damping toothed rotary gear comprises a molded plastic.

6. The adjustable head restraint assembly as claimed in claim 1, wherein said assembly will not pivot under collision conditions.

7. The adjustable head restraint assembly as claimed in claim 1, wherein said assembly may be positioned anywhere along its range of movement.

8. The adjustable head restraint assembly as claimed in claim 1, wherein said assembly is normally engaged to prevent rearward movement.

9. The adjustable head restraint assembly as claimed in claim 1, wherein said toothed ratcheting rack is mounted on said horizontal portion of said mounting post.

10. The adjustable head restraint assembly as claimed in claim 1, wherein a pressure plate is biased against the interior surface of the front face of the head restraint and operable connected to the end of said plunger.

11. The adjustable head restraint assembly as claimed in claim 1, wherein said assembly is operatively connected to a seatback frame through a guide sleeve.

12. The adjustable head restraint assembly as claimed in claim 1, wherein said assembly is positioned by applying an activating force against said plunger end.

13. The adjustable head restraint assembly as claimed in claim 1, wherein a first pressing on said plunger unlocks said head restraint assembly and allows forward movement thereof and a second pressing on said plunger stops said forward movement and locks the head restraint assembly from further forward movement.

14. The adjustable head restraint assembly as claimed in claim 13, wherein said adjustable head restraint is prevented from forward movement during a collision by said inertia springs.

15. The adjustable head restraint assembly as claimed in claim 1, wherein a fluid damper is operably connected to said linear damping toothed rotary gear.

16. An adjustable head restraint assembly comprising:
  a mounting post having a horizontal portion;
  a head restraint portion disposed about said mounting post horizontal portion and further characterized as mounted to at least one spring mounted fixedly about said mounting post horizontal portion;
  pivoting bracket connecting said head restraint body to said mounting post horizontal portion for enabling said head restraint body to pivot relative to said mounting post;
  ratcheting means acting between said mounting post and said head restraint body for permitting said head restraint body to pivot in a first direction and selectively locking said head restraint body against pivotal movement in a direction opposite said first direction, said ratcheting means including a ratcheting gear having a plurality of teeth and a pawl having a pair of teeth containing ends, for selectively alternatively engaging said ratcheting gear teeth, a first pawl end when engaged allowing movement of the ratcheting gear only in a first direction and a second pawl end when engaged allowing movement of the ratcheting gear in a direction opposite said first direction only, to control the movement of said head restraint body; and
characterized by said ratcheting means comprises;
  a ratcheting position locking mechanism comprising;
    a pivoting bracket for mounting an inertia spring connecting rod,
    an inertia spring pawl connecting rod for mounting one end of a plurality of inertia springs, and inertia lock assembly and the non-ratcheting gear engaging end of a said pawl,
    a plurality of inertia springs,
    a pawl mounting rod for mounting said pawl to said pivoting bracket,
    a ratcheting gear mounted on said mounting post horizontal portion upon which said pawl engages as well as linear damping toothed rotary gear in operable engagement with said ratcheting gear to slow the forward motion of said adjustable head restraint assembly during forward positioning; and
  a ratchet plunger release mechanism comprising a plunger end, having a pressure activation unit mounted thereon, said plunger mounted within a mounting sleeve, both being mounted on a plunger rod, said plunger rod moveably mounted through said pivoting bracket and having a plunger end return biasing spring mounted on said plunger rod between said mounting sleeve and said pivoting bracket to return said plunger end to a forward most position when rearward pressure is removed from said plunger end.

17. The adjustable head restraint assembly as claimed in claim 16, wherein said assembly is positioned by applying an activating force against said plunger end.

18. The adjustable head restraint assembly as claimed in claim 16, wherein a fluid damper is operably connected to said linear damping toothed rotary gear.

19. The adjustable head restraint assembly as claimed in claim 16, wherein a first pressing on said plunger unlocks said head restraint assembly and allows forward movement thereof and a second pressing on said plunger stops said forward movement and locks the head restraint assembly from further forward movement.

20. The adjustable head restraint assembly as claimed in claim 19, wherein said adjustable head restraint is prevented from forward movement during a collision by said inertia springs.

* * * * *